United States Patent
Wang et al.

(10) Patent No.: US 9,838,816 B2
(45) Date of Patent: Dec. 5, 2017

(54) SPEAKER MODULE AND MANUFACTURING METHOD THEREFOR

(71) Applicant: GOERTEK INC., WeiFang (CN)

(72) Inventors: Xin Wang, WeiFang (CN); Yitao Liu, WeiFang (CN)

(73) Assignee: GOERTEK INC., Weifang (KR)

( * ) Notice: Subject to any disclaimer, the term of this patent is extended or adjusted under 35 U.S.C. 154(b) by 0 days.

(21) Appl. No.: 15/103,227

(22) PCT Filed: Aug. 15, 2014

(86) PCT No.: PCT/CN2014/084532
§ 371 (c)(1),
(2) Date: Jun. 9, 2016

(87) PCT Pub. No.: WO2015/085789
PCT Pub. Date: Jun. 18, 2015

(65) Prior Publication Data
US 2016/0309272 A1 Oct. 20, 2016

(30) Foreign Application Priority Data

Dec. 9, 2013 (CN) .......................... 2013 1 0659401

(51) Int. Cl.
*H04R 1/02* (2006.01)
*H04R 31/00* (2006.01)
(Continued)

(52) U.S. Cl.
CPC .............. *H04R 31/00* (2013.01); *B29B 11/08* (2013.01); *B29C 45/14336* (2013.01);
(Continued)

(58) Field of Classification Search
USPC ....... 381/115, 117, 162, 186, 190, 386, 387, 381/395, 332
See application file for complete search history.

(56) References Cited

U.S. PATENT DOCUMENTS

2011/0226545 A1* 9/2011 Richardson .......... H04B 1/3888
181/200
2014/0056447 A1* 2/2014 Li ............................ H04R 1/00
381/162

FOREIGN PATENT DOCUMENTS

CN 101420643 A 4/2009
CN 201349232 Y 11/2009
(Continued)

OTHER PUBLICATIONS

Office Action from Chinese Patent Office for Application No. 201310659401.3, dated Jan. 27, 2016.
(Continued)

*Primary Examiner* — Yosef K Laekemariam

(57) ABSTRACT

Provided are a speaker module and a manufacturing method therefor. The speaker module comprises a housing and a speaker unit comprising a vibrating diaphragm component and a magnetic circuit component. A front acoustic cavity and a rear acoustic cavity are formed between the speaker unit and the housing. An elastic element is provided on the housing and coupled to the end surface of an open end of the front or rear acoustic cavity. Use of the speaker module can reduce a step of manual fitting of the elastic element, ensure precision and stability, so that the elastic element is not prone to fall off, and tightness between sound outlet hole of the speaker module and sound hole of mobile phone can be ensured. The manufacturing method for the speaker module also can be extended to manufacturing of other structures requiring injection of a soft or rigid material into another material.

10 Claims, 4 Drawing Sheets

(51) Int. Cl.
    *H04R 9/06* (2006.01)
    *B29B 11/08* (2006.01)
    *B29C 45/14* (2006.01)
    *H04R 9/02* (2006.01)
    *B29K 21/00* (2006.01)
    *B29K 75/00* (2006.01)
    *B29K 105/00* (2006.01)
    *B29L 31/34* (2006.01)

(52) U.S. Cl.
    CPC ............... *H04R 9/025* (2013.01); *H04R 9/06* (2013.01); *B29C 2045/1495* (2013.01); *B29K 2021/003* (2013.01); *B29K 2075/00* (2013.01); *B29K 2105/0061* (2013.01); *B29L 2031/3418* (2013.01); *H04R 2499/11* (2013.01)

(56) References Cited

FOREIGN PATENT DOCUMENTS

| | | |
|---|---|---|
| CN | 201365324 Y | 12/2009 |
| CN | 202395941 U | 8/2012 |
| CN | 103269462 A | 8/2013 |
| CN | 103618984 A | 3/2014 |
| CN | 203618118 U | 5/2014 |

OTHER PUBLICATIONS

Office Action from Korean Patent Office for Application No. 10-2016-7015660, dated Dec. 20, 2016.
International Search Report for International Patent Application No. PCT/CN2014/084532 filed Aug. 15, 2014.

\* cited by examiner

SPEAKER MODULE AND MANUFACTURING METHOD THEREFOR

The present invention is a U.S. National Stage of PCT/CN2014/084532, filed Aug. 15, 2014, which claims the priority of Chinese patent application No. 201310659401.3 filed on Dec. 9, 2013, which are incorporated herein by reference.

TECHNICAL FIELD

The present invention relates to the technical field of electroacoustics, especially, to a speaker module and a manufacturing method for the speaker module.

BACKGROUND

Speaker module is an important acoustical component in portable electronic equipment, is used for transforming electric energy into acoustic energy, and is a sound production component for portable electronic equipment. In the prior art, the speaker module generally comprises a housing and a speaker unit accommodated in the housing, wherein, the speaker unit comprises a vibrating diaphragm component and a magnetic circuit component. A front acoustic cavity and a rear acoustic cavity are provided in the speaker module. The front acoustic cavity is surrounded by one side of the housing facing the vibrating diaphragm component and the vibrating diaphragm component jointly. The rear acoustic cavity is surrounded by one side of the housing away from the front acoustic cavity and the vibrating diaphragm component jointly. As for the speaker module producing sound from the front, an open end of the front acoustic cavity is provided at one side of the housing corresponding to the front acoustic cavity, that is, a sound outlet hole.

Take the application of the speaker module in mobile phone as an example, the open end of the front acoustic cavity of the speaker module is combined with a connector on the mobile phone provided with a sound hole, and enables the sound outlet hole of the speaker module to be in communication with the sound hole of the mobile phone, and the airtightness of the front acoustic cavity of the speaker module should be ensured, so as to prevent air leakage and undesirable performance. Generally, an elastic element is provided at the joint parts of the open end of the front acoustic cavity of the speaker module and the connector of the mobile phone, and is sealed by achieving a certain amount of compression. The elastic element is a separate component, which is bonded to the bonding surfaces of the speaker module and the front acoustic cavity manually after formation, and then assembled with a terminal electronic product such as a mobile phone, etc.

In such a design, the shape of the elastic element is required to have regularity. However, the joint parts of different terminal electronic products and speaker modules have different shapes and structures, and the joint parts have irregular shapes and complex structures, such that the elastic elements to be fitted have irregular shapes and complex structures as well. Because the elastic elements are soft and have complex shapes which are not easy to control, high accuracy is required when the elastic elements with complex shapes are bonded manually, which cause lower labor efficiency and higher quality risks. Sometimes, due to special requirements on assembly methods of clients, the elastic elements are easy to fall off when bonded manually, which cannot meet customers' requirements.

SUMMARY

The first objective of the present invention is to provide a speaker module, which is capable of facilitating installation and combination with terminal electronic products, and improving work efficiency, meanwhile, the elastic element is not easy to fall off and has good adhesion, and airtightness between the open end of the front acoustic cavity or rear acoustic cavity of the speaker module and the terminal electronic product can be ensured, thereby improving its acoustic performance.

A speaker module, comprising a housing and a speaker unit accommodated in the housing, wherein, the speaker unit comprises a vibrating diaphragm component and a magnetic circuit component, a front acoustic cavity and a rear acoustic cavity are formed between the speaker unit and the housing, respectively, wherein, an elastic element is provided on the housing, the elastic element is coupled to an end surface of an open end of the front acoustic cavity or the rear acoustic cavity on the housing, and the elastic element and the housing are formed through injection molding to form an integral structure.

As a modified solution, the housing comprises an upper housing, a middle housing and a lower housing, wherein, the upper housing together with the middle housing and the speaker unit forms the front acoustic cavity; the upper housing comprises an injection-molded substrate on which the open end of the front acoustic cavity is provided, and the elastic element is formed on the open end of the front acoustic cavity through injection molding.

As a modified solution, mutually matched undercut structures are provided at the joint parts of the injection-molded substrate and the elastic element.

As a modified solution, the undercut structures comprise catching teeth protruding outward which are provided on the elastic element, and catching grooves provided on the injection-molded substrate correspondingly; or the undercut structures comprise catching teeth protruding outward which are provided on the injection-molded substrate, and catching grooves provided on the elastic element correspondingly.

As a modified solution, the elastic element is a TPU elastic element, or a TPE elastic element, or a silica gel elastic element.

The second objective of the present invention is to provide a manufacturing method for the above-mentioned speaker module, the manufacturing method comprises the following steps:

step (a): forming an integral structure composed of the injection-molded substrate and the elastic element through two-shot injection molding process to fabricate the upper housing; and step (b): assembling the upper housing, the middle housing, the electric connecting piece in the middle housing, the vibrating diaphragm component, the magnetic circuit component and the lower housing together to fabricate the speaker module.

As a modified solution, the step (a) comprises the following steps:

step (a1): forming the injection-molded substrate through a first injection molding process; and step (a2): forming the elastic element at the open end of the front acoustic cavity of the injection-molded substrate through a second injection molding process, wherein, the elastic element is integral with the injection-molded substrate formed by the first injection molding process to form the integral structure, so as to fabricate the upper housing.

As a modified solution, mutually matched undercut structures are provided at the joint parts of the injection-molded substrate and the elastic element.

As a modified solution, the undercut structures comprise catching teeth protruding outward which are provided on the elastic element, and catching grooves provided on the injection-molded substrate correspondingly; or the undercut structures comprise catching teeth protruding outward which are provided on the injection-molded substrate, and catching grooves provided on the elastic element correspondingly.

As a modified solution, the elastic element is a TPU elastic element, or a TPE elastic element, or a silica gel elastic element.

In the speaker module provided by the present invention, as the elastic element integrally formed with the housing through injection molding is provided at the open end of the front acoustic cavity or rear acoustic cavity on the housing, the firmness of bonding between the elastic element and the housing is ensured, bonding accuracy and stability are improved, and the possibility of the elastic element falling off is decreased. When the speaker module is mounted on a terminal electronic product, it is possible to ensure the airtightness between the open end of the front acoustic cavity or rear acoustic cavity of the speaker module and the connector of the terminal electronic product, ensure the acoustic performance of the electronic product as a whole. Use of the speaker module with such a structure also omits a step of manual fitting of the elastic element, which reduces the worker's labour intensity, and improves work efficiency as well.

The manufacturing method for the speaker module not only effectively solves the described technical problem, but also can be extended to manufacturing of other structures requiring injection of a soft material or a rigid material into another material.

Figure 1:
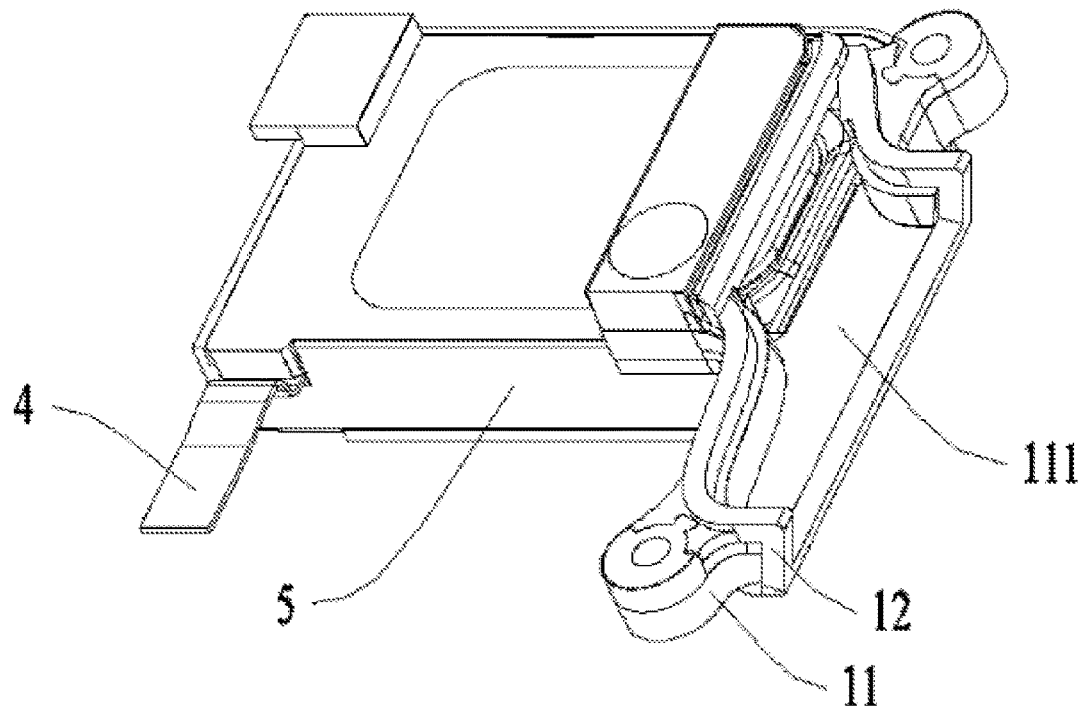
FIG. 1 is a structure schematic view of the speaker module provided by the embodiments of the present invention viewing in the front direction.
Figure 2:
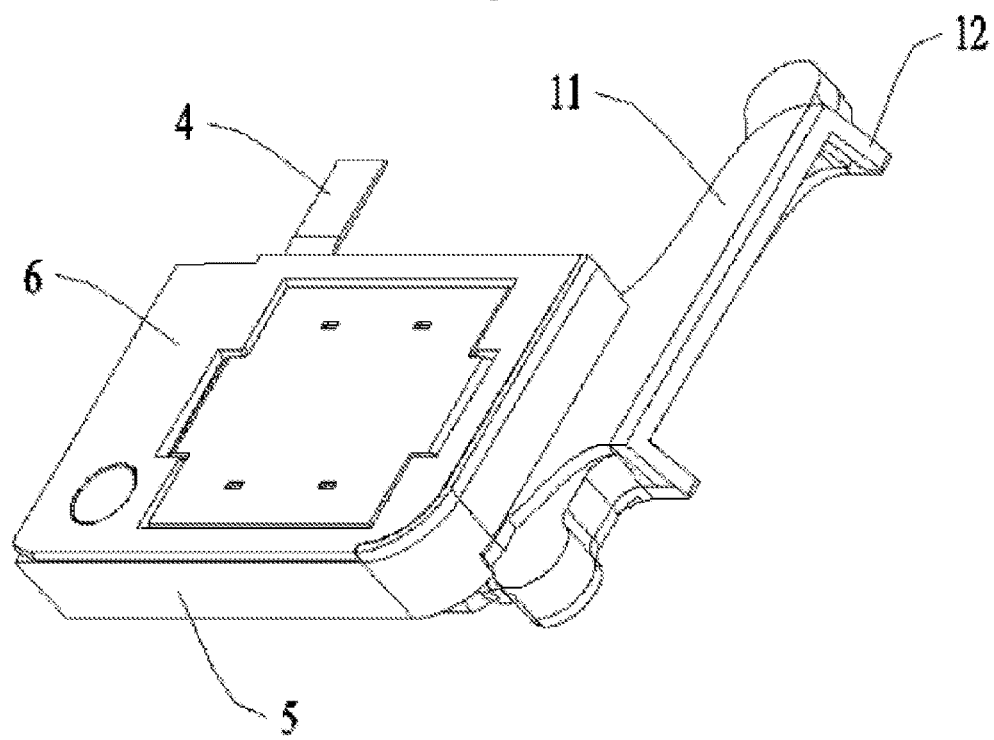
FIG. 2 is a structure schematic view of the speaker module in FIG. 1 viewing in the rear direction.
Figure 3:
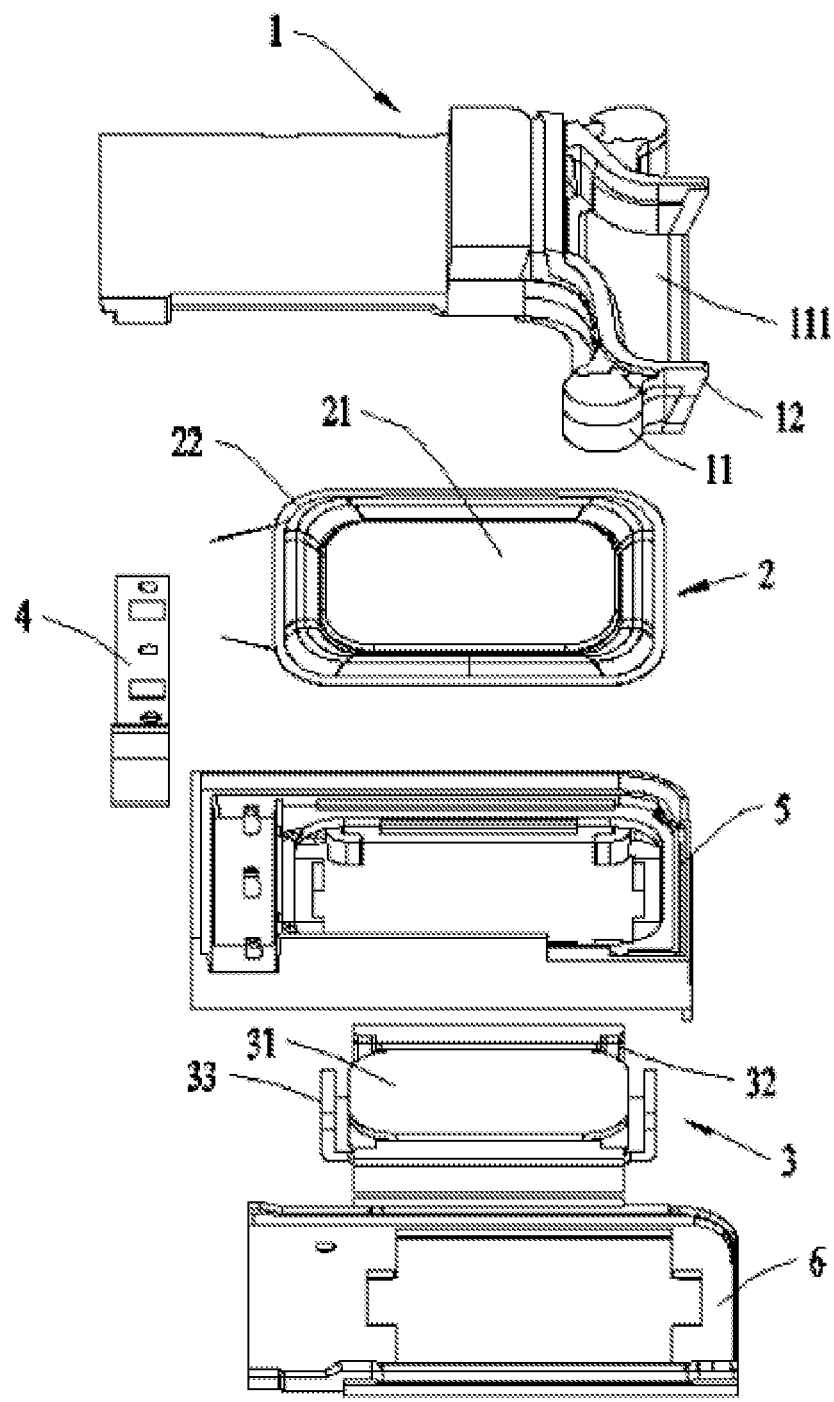
FIG. 3 is a three-dimensional exploded view of the speaker module in FIG. 1.
Figure 4:
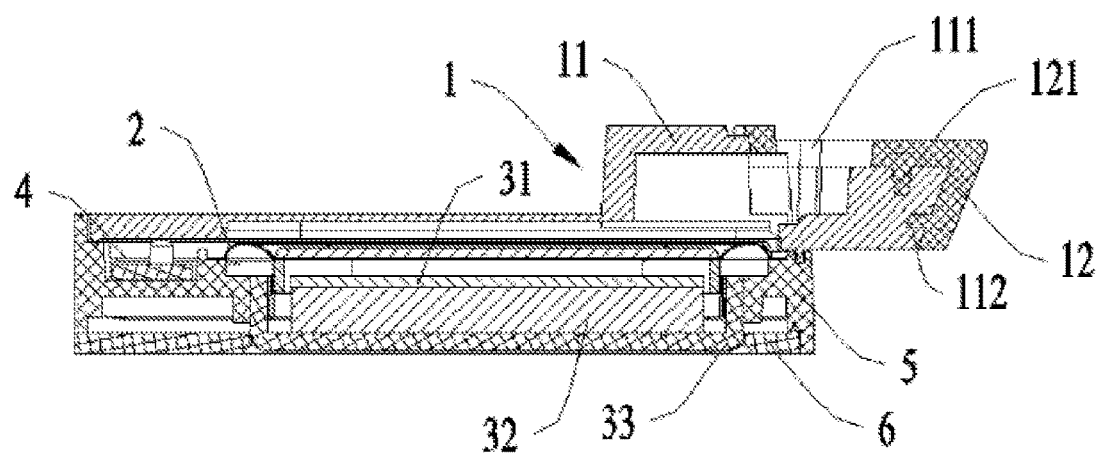
FIG. 4 is a structural section view of the speaker module in FIG. 1.

The reference numbers in the drawings comprise: 1—upper housing; 11—injection-molded substrate; 111—sound outlet hole; 112—catching groove; 12—elastic element; 121—catching teeth; 2—vibrating diaphragm component; 21—vibrating diaphragm; 22—voice coil; 3—magnetic circuit component; 31—pole plate; 32—magnet; 33—yoke; 4—flexible circuit board; 5—middle housing; 6—lower housing; 7—connector; 71—sound hole.

DETAILED DESCRIPTION OF EMBODIMENTS

Hereinafter, the present invention will be further described in details in connection with accompanying drawings and embodiments in order to make the objectives, technical schemes and advantages of the present invention more clear. It will be understood that the discussed particular embodiments are only used for explaining the present invention, but does not limit the present invention.

FIG. 1 to FIG. 4 show the structure schematic view of the speaker module provided by the embodiments of the present invention jointly, and only structural components related to the present invention are provided in the figures in order to facilitate illustration.

The speaker module comprises a housing and a speaker unit accommodated in the housing. The speaker unit comprises a vibrating diaphragm component 2 and a magnetic circuit component 3. A front acoustic cavity and a rear acoustic cavity are formed between the speaker unit and the housing, respectively. Wherein, the vibrating diaphragm component 2 comprises a vibrating diaphragm 21 and a voice coil 22 bonded to the lower side of the vibrating diaphragm 21. The magnetic circuit component 3 comprises a pole plate 31, a magnet 32 and a yoke 33 that are sequentially combined together. An elastic element 12 is provided on the housing. The elastic element 12 is coupled to the end surface of an open end of the front acoustic cavity or the rear acoustic cavity on the housing which contacts with terminal electronic product. The elastic element 12 and the housing are formed through injection molding to form an integral structure. As the elastic element 12 integrally formed with the housing through injection molding is provided at the open end of the front acoustic cavity or rear acoustic cavity on the housing, the adhesion of the elastic element 12 and the housing is ensured, bonding accuracy and stability is improved, and the possibility of the elastic element 12 falling off is decreased.

Figure 5:
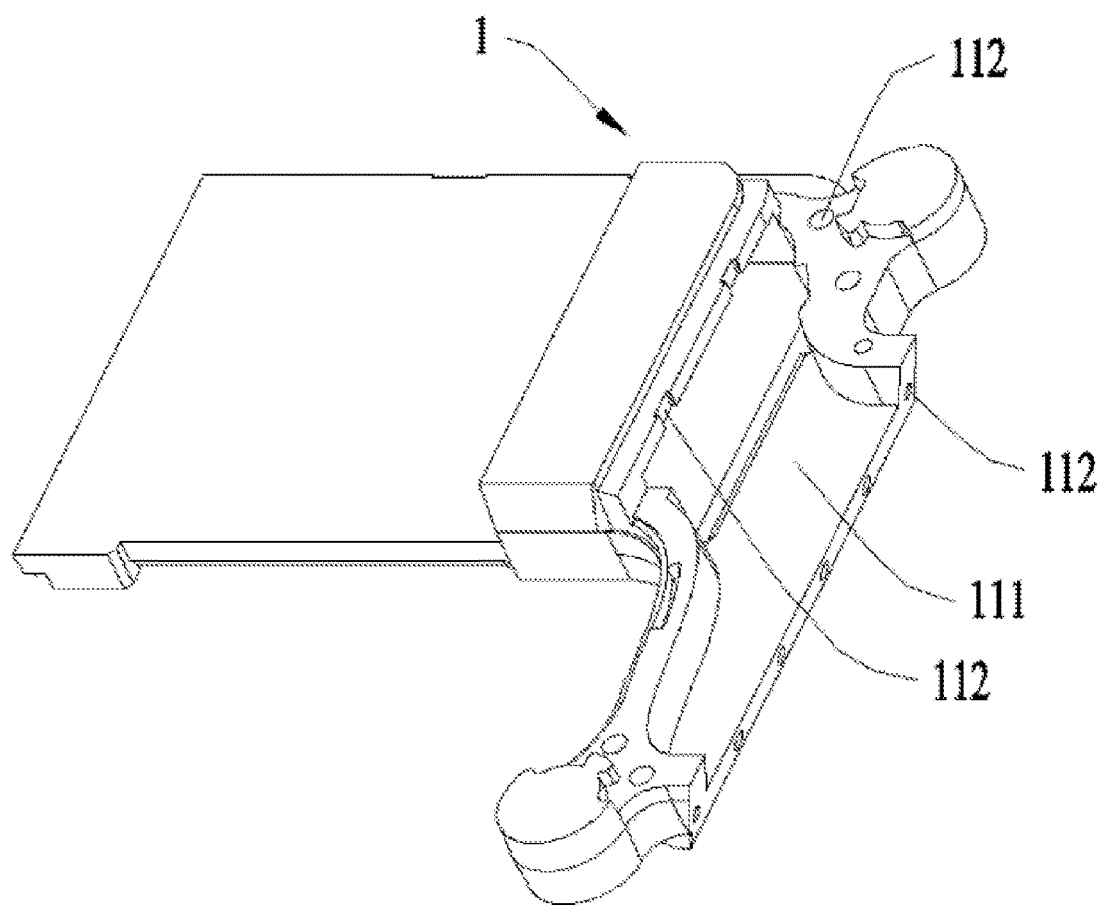
FIG. 5 is a structure schematic view of the injection-molded substrate provided by the embodiments of the present invention.
Figure 6:
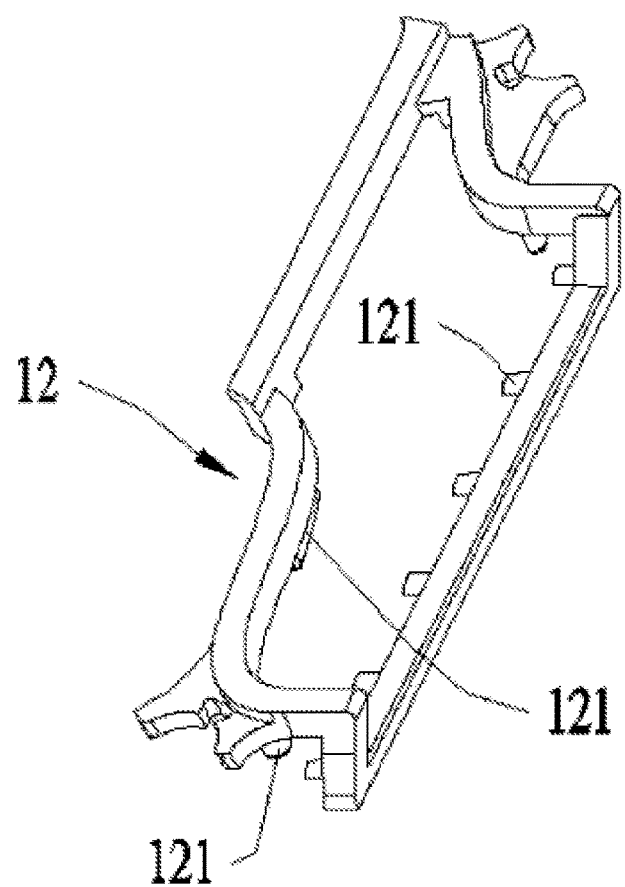
FIG. 6 is a structure schematic view of the elastic element fitting with the injection-molded substrate in FIG. 5.
Figure 7:
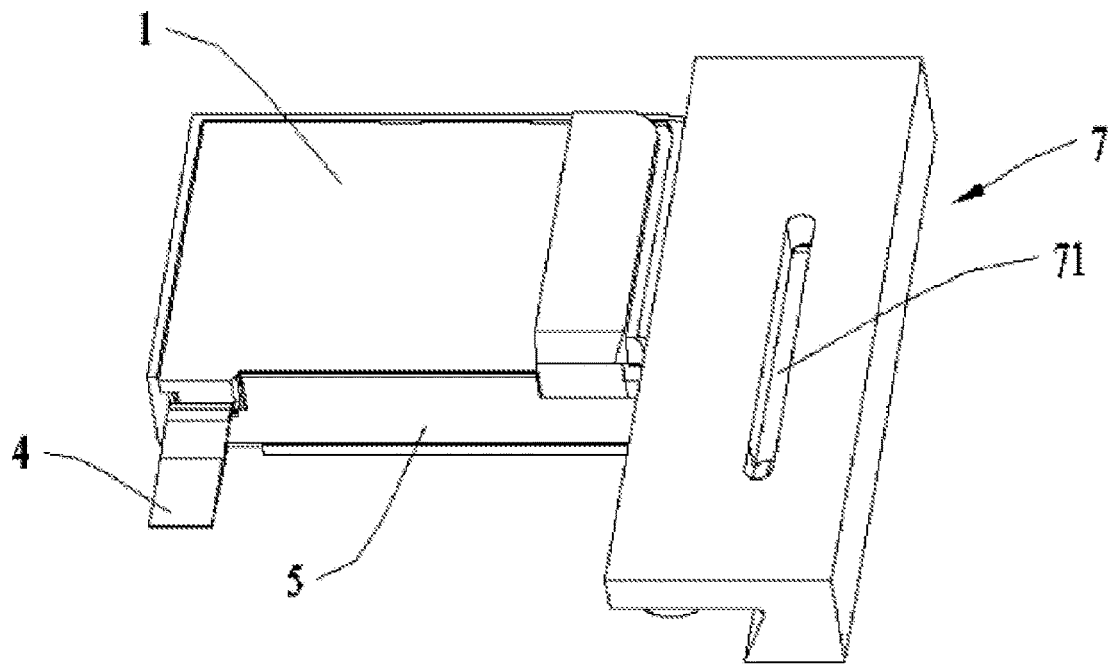
FIG. 7 is a structure schematic view of the speaker module, which is provided by the embodiments of the present invention, combined with a connector of a mobile phone.

Take the application of the speaker module in mobile phone as an example, as shown in FIG. 5 to FIG. 7, the open end of the front acoustic cavity of the speaker module is a sound outlet hole. The housing comprises an upper housing 1, a middle housing 5 and a lower housing 6, wherein, the upper housing 1 together with the middle housing 5 and the speaker unit forms the front acoustic cavity of the speaker module; the upper housing 1 comprises an injection-molded substrate 11 on which the open end of the front acoustic cavity is provided, and the elastic element 12 is formed on the open end of the front acoustic cavity of the injection-molded substrate 11 through injection molding. The open end of the front acoustic cavity of the injection-molded substrate 11 is combined with a connector 7 provided with a sound hole on the mobile phone, and the sound outlet hole 111 of the speaker module is in communication with the sound hole 71 of the mobile phone. By integrally forming the elastic element 12 on the open end of the front acoustic cavity of the injection-molded substrate 11 through injection molding, it is possible to ensure the airtightness between the open end of the front acoustic cavity of the speaker module and the connector 7 of the mobile phone, prevent air leakage effectively, ensure the acoustic performance of the mobile phone. Use of the speaker module with such a structure also omits a step of manual fitting of the elastic element, which reduces the worker's labour intensity, and improves work efficiency as well.

In the embodiments, mutually matched undercut structures are provided at the joint parts of the injection-molded substrate 11 and the elastic element 12. In the embodiments, the undercut structures comprise catching teeth 121 protruding outward which are provided on the elastic element 12, and catching grooves 112 provided on the injection-molded substrate 11 correspondingly, which enables stable cementation and firmly snap-fitting between the injection-molded substrate 11 and the elastic element 12, and can effectively prevent the elastic element 12 and the injection-molded substrate 11 from separation. Similarly, the same effect can be achieved by the undercut structures which comprise the catching teeth provided on the injection-molded substrate 11, and the catching grooves provided on the elastic element 12 correspondingly.

In the embodiments, TPU (Thermoplastic polyurethanes), or TPE (Thermoplastic Elastomer), or silica gel material is used for forming the elastic element 12, which can ensure the injection moldability of the elastic element 12, improve the firmness of bonding between the injection-molded substrate 11 and the elastic element, ensure the elasticity of the elastic element 12 after injection molding, and thus ensure its sealing effect.

The manufacturing method for the speaker module comprises the following steps:

step (a): forming an integral structure composed of the injection-molded substrate 11 and the elastic element 12 through two-shot injection molding process to fabricate the upper housing 1, specifically, the step (a) comprises the following steps:

step (a1): forming the injection-molded substrate 11 through a first injection molding process; and step (a2): forming the elastic element 12 at the open end of the front acoustic cavity of the injection-molded substrate 11 through a second injection molding process, wherein, the elastic element is integral with the injection-molded substrate 11 formed by the first injection molding process to form the integral structure, so as to fabricate the upper housing 1; and step (b): assembling the upper housing 1, the middle housing 5, the electric connecting piece in the middle housing 5, the vibrating diaphragm component 2, the magnetic circuit component 3 and the lower housing 6 together to fabricate the speaker module. In the embodiments, the electric connecting piece is a flexible circuit board 4.

By using an integrated upper housing 1 composed of the injection-molded substrate 11 and the elastic element 12 manufactured by such two-shot injection molding process, the complex elastic element 12 which is hard to be bonded manually is injection-molded into the injection-molded substrate 11 directly. In this way, the elastic element 12 does not need to be bonded as a separate component manually, and elastic elements with more complex structures can be injection-molded as desired. The adhesion of bonding between the elastic element 12 and the injection-molded substrate 11 is ensured, bonding accuracy and stability is improved, the possibility of the elastic element 12 falling off is decreased, and a step of manual fitting of the elastic element 12 is omitted, which reduces the worker's labour intensity, and improves work efficiency as well.

When the assembled speaker module is installed on the terminal electronic product, it is possible to ensure the airtightness between the open end of the front acoustic cavity or rear acoustic cavity of the speaker module and the connector 7 of the terminal electronic product, which ensures the acoustic performance of the electronic product as a whole. The manufacturing method for the speaker module not only effectively solves the described technical problem, but can also be extended to manufacturing of other structures requiring injection of a soft material or a rigid material into another material.

In the speaker module provided by the present invention, as the elastic element integrally formed with the housing through injection molding is provided at the open end of the front acoustic cavity or rear acoustic cavity on the housing, the firmness of bonding between the elastic element and the housing is ensured, bonding accuracy and stability is improved, and the possibility of the elastic element falling off is decreased. When the speaker module is mounted on the terminal electronic product, it is possible to ensure the airtightness between the open end of the front acoustic cavity or rear acoustic cavity of the speaker module and the connector of the terminal electronic product, ensure the acoustic performance of the electronic product as a whole. Use of the speaker module with such a structure also omits a step of manual fitting of the elastic element, which reduces the worker's labour intensity, and improves work efficiency as well.

The manufacturing method for the speaker module not only effectively solves the described technical problem, but can also be extended to manufacturing of other structures requiring injection of a soft material or a rigid material into another material.

The abovementioned is only preferred embodiments of the present invention, and is not intended to limit the present invention. Any modifications, equivalent substitutions, improvements and the like within the spirit and principle of the present invention should be incorporated into the scope of protection of the present invention.

The invention claimed is:

1. A speaker module, comprising a housing and a speaker unit accommodated in the housing,
    wherein, the speaker unit comprises a vibrating diaphragm component and a magnetic circuit component, a front acoustic cavity and a rear acoustic cavity are formed between the speaker unit and the housing, respectively,
    wherein, an elastic element is provided on the housing, the elastic element is coupled to an end surface of an open end of the front acoustic cavity or the rear acoustic cavity on the housing, and the elastic element and the housing are formed through injection molding to form an integral structure.

2. The speaker module according to claim 1, wherein, the housing comprises an upper housing, a middle housing and a lower housing, wherein, the upper housing together with the middle housing and the speaker unit forms the front acoustic cavity; the upper housing comprises an injection-molded substrate on which the open end of the front acoustic cavity is provided, and the elastic element is formed on the open end of the front acoustic cavity through injection molding.

3. The speaker module according to claim 2, wherein, mutually matched undercut structures are provided at joint parts of the injection-molded substrate and the elastic element.

4. The speaker module according to claim 3, wherein, the undercut structures comprise catching teeth protruding outward which are provided on the elastic element, and catching grooves provided on the injection-molded substrate correspondingly; or the undercut structures comprise catching teeth protruding outward which are provided on the injection-molded substrate, and catching grooves provided on the elastic element correspondingly.

5. The speaker module according to claim 1, wherein, the elastic element is a TPU elastic element, or a TPE elastic element, or a silica gel elastic element.

6. A manufacturing method for the speaker module according to claim 2, wherein, the manufacturing method comprises following steps:
  step (a): forming the integral structure composed of the injection-molded substrate and the elastic element through two-shot injection molding process, so as to fabricate the upper housing; and
  step (b): assembling the upper housing, the middle housing, an electric connecting piece in the middle housing, the vibrating diaphragm component, the magnetic circuit component and the lower housing together to fabricate the speaker module.

7. The manufacturing method according to claim 6, wherein, the step (a) comprises following steps:
  step (a1): forming the injection-molded substrate through a first injection molding process; and
  step (a2): forming the elastic element at the open end of the front acoustic cavity of the injection-molded substrate through a second injection molding process, wherein, the elastic element is integral with the injection-molded substrate formed by the first injection molding process to form the integral structure, so as to fabricate the upper housing.

8. The manufacturing method according to claim 6, wherein, mutually matched undercut structures are provided at joint parts of the injection-molded substrate and the elastic element.

9. The manufacturing method according to claim 8, wherein, the undercut structures comprise catching teeth protruding outward which are provided on the elastic element, and catching grooves provided on the injection-molded substrate correspondingly; or the undercut structures comprise catching teeth protruding outward which are provided on the injection-molded substrate, and catching grooves provided on the elastic element correspondingly.

10. The manufacturing method according claim 9, wherein, the elastic element is a TPU elastic element, or a TPE elastic element, or a silica gel elastic element.

* * * * *

UNITED STATES PATENT AND TRADEMARK OFFICE
CERTIFICATE OF CORRECTION

PATENT NO. : 9,838,816 B2  
APPLICATION NO. : 15/103227  
DATED : December 5, 2017  
INVENTOR(S) : Xin Wang and Yitao Liu Page 1 of 1

It is certified that error appears in the above-identified patent and that said Letters Patent is hereby corrected as shown below:

On the Title Page

Item (73), Assignee, change "(KR)" to "(CN)"

Signed and Sealed this  
Twelfth Day of February, 2019

Andrei Iancu  
*Director of the United States Patent and Trademark Office*